G. W. ROLLINS.
TOOL FOR REMOVING SHAFT COUPLINGS.
APPLICATION FILED NOV. 5, 1917.
1,310,806.
Patented July 22, 1919.
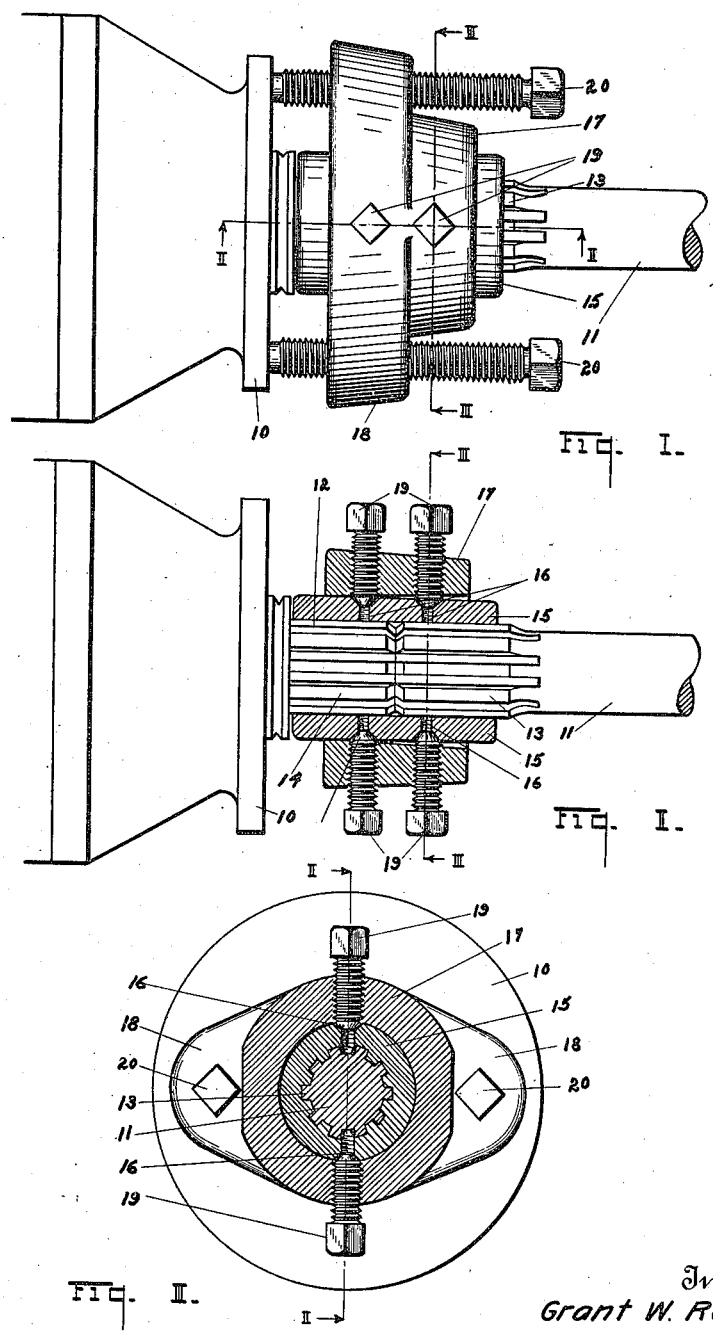
Inventor
Grant W. Rollins
By Chester H Braselton
Attorney

UNITED STATES PATENT OFFICE.

GRANT W. ROLLINS, OF TOLEDO, OHIO, ASSIGNOR TO THE WILLYS-OVERLAND COMPANY, OF TOLEDO, OHIO, A CORPORATION OF OHIO.

TOOL FOR REMOVING SHAFT-COUPLINGS.

1,310,806.

Specification of Letters Patent.

Patented July 22, 1919.

Application filed November 5, 1917. Serial No. 200,319.

*To all whom it may concern:*

Be it known that I, GRANT W. ROLLINS, a citizen of the United States, residing at Toledo, county of Lucas, and State of Ohio, have invented certain new and useful Improvements in Tools for Removing Shaft-Couplings, of which I declare the following to be a full, clear, and exact description.

This invention relates to improvements in tools for removing shaft couplings.

The principal object of this invention is to provide an improved tool, which may be very conveniently and effectively used to remove a shaft coupling, such as is used to couple the propeller shaft to the transmission mechanism of a motor vehicle.

Further objects, the objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a view in side elevation of a tool constructed in accordance with my invention, showing it applied in position for removing the shaft coupling from a propeller shaft.

Fig. II is a vertical, sectional view, taken substantially on the line II—II of Figs. I and III.

Fig. III is a detail, sectional view, taken substantially on the line III—III of Figs. I and II.

In the drawings, similar reference numerals refer to similar parts throughout the several views, and the sectional views are taken looking in the direction of the little arrows at the ends of the section lines.

Considering the numbered parts of the drawing, I have shown the casing 10 of the transmission mechanism of a motor vehicle, and a propeller shaft 11, which is connected to the transmission shaft 12 by means of a coupling 15. The end of the propeller shaft 11 is provided with splines 13 and the transmission shaft is also provided with splines 14. The coupling 15, which connects the propeller shaft 11 to the transmission shaft 12, is provided with grooves or ways, in which the splines 13 and 14 are disposed, and said coupling 15 is also provided with radially extending openings 16, in which set screws are normally inserted for securing the coupling 15 in place on the shafts to couple them together.

My invention has to do with a tool by means of which the coupling 15 can be easily and quickly removed so as to disconnect the shaft 11 from the transmission shaft 12. The set screws which are normally disposed in the opening 16 are first removed. The tool comprises a ring 17, which is provided with laterally extending ears 18. The ring 17 carries the radially extending set screws 19, the ends of which are adapted to engage in the ends of the openings 16, in which the set screws for securing the coupling 15 to the shafts 11 and 12 are normally disposed. The ring 17 is slipped over the coupling 15, the opening in said ring 17 being large enough to permit of its being placed over the coupling 15 and the set screws 19 are screwed up until the ends are firmly seated in the openings 16 of the coupling 15. The ears 18 carry the set screws 20, which extend parallel to the axis of the ring 17 and the coupling 15, and the ends of said set screws 20 are adapted to engage the transmission case 10.

From the description of the parts given above, the operation of this device should be very readily understood. The drawings show the tool in position for use to remove the coupling 15. The ring 17 is connected to the coupling 15 by the engagement of the set screws 19 with the openings 16, and when the set screws 20 are turned up, since their ends abut against the casing 10, the ring 17 and the coupling 15 carried thereby will be forced away from the casing 10, thus forcing the coupling 15 off of the end of the transmission shaft 12, so that the propeller shaft 11 will be disconnected from the shaft 12. When the coupling has been thus removed, the set screws 19 are screwed out, so that the ring 17 is released from the coupling 15 and may be removed.

I am aware that the particular embodiment of my invention, which I have here shown and described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. A device of the class described, comprising a ring, provided with a plurality of radially extending set screws carried thereby and a plurality of set screws extending parallel to the axis of said ring and spaced from each other circumferentially of the ring.

2. A device of the class described, comprising a ring, having a central opening extending therethrough adapted to receive a shaft coupling; a plurality of set screws carried by said ring, and extending radially thereof and adapted to engage said coupling; and a plurality of set screws carried by said ring extending parallel to the axis thereof, and spaced from each other circumferentially of the ring.

3. A device of the class described, comprising the combination of a ring, having a central opening adapted to receive a shaft coupling; a plurality of set screws carried by said ring and extending radially thereof at diametrically opposite points of said ring, said set screws being adapted to engage said coupling; and a plurality of set screws carried by said ring at diametrically opposite points thereof, and extending parallel to the axis thereof.

4. A device of the class described, comprising the combination of a ring provided with a pair of laterally extending ears, and a central opening large enough to receive a shaft coupling; set screws extending radially through the wall of said ring, and adapted to engage said shaft coupling, said set screws being disposed at diametrically opposite points of said ring; and a set screw extending through each of said ears and parallel to the axis of said ring.

In testimony whereof I affix my signature.

GRANT W. ROLLINS.

Copies of this patent may be obtained for five cents each, by addressing the "Commissioner of Patents, Washington, D. C."